UNITED STATES PATENT OFFICE.

NATHAN GRÜNSTEIN, OF FRANKFORT-ON-THE-MAIN, GERMANY.

PROCESS OF MAKING ALDOL.

1,234,156. Specification of Letters Patent. Patented July 24, 1917.

No Drawing. Application filed December 13, 1916. Serial No. 136,793.

*To all whom it may concern:*

Be it known that I, NATHAN GRÜNSTEIN, a subject of the Emperor of Russia, and resident of Frankfort-on-the-Main, Germany, have invented certain new and useful Improvements in Processes of Making Aldol, of which the following is a specification.

As is well known, the manufacture of aldol, etc., from acetaldehyde presents great technical difficulties. It has been found now that pure acetaldehyde can be converted in a simple manner, and in satisfactory quantities into more valuable products of condensation such as aldol, by treating it with certain catalyzers. If pure acetaldehyde is treated with small quantities of strontium oxid, calcium oxid or a mixture thereof, a violent reaction with a strong generation of heat takes place, and a thick fluid product is formed from which aldol can be obtained, in satisfactory quantities, by vacuum distillation.

It has been found further that the condensation of acetaldehyde is strongly affected by the presence of small quantities of water in acetaldehyde. The addition of only a little water to acetaldehyde—namely when the above mentioned catalyzers are used—results in the reaction being accelerated and the action of the catalyzers strengthened, so that the condensation can be carried through in a shorter time, and in certain conditions with smaller quantities of the catalyzer.

Moreover, when water-containing acetaldehyde is used, other substances such as metals or carbids of alkaline earths, for example calcium carbid, strontium carbid or their mixtures, can be advantageously used as catalyzers which substances in small quantities either do not act on anhydrous acetaldehyde at all or act only slightly. The metals and carbids, as well as the oxids, of the alkaline earths will be herein referred to as alkaline earth metal-containing substances capable of reacting with water to form hydroxids.

The last named catalyzers can also be used in combination with the above mentioned oxids. The influence of small quantities of water on the reaction will be seen from the following example:

Anhydrous acetaldehyde mixed with 5% of its weight of calcium carbid, remained unaltered after ten days, while acetaldehyde containing 5-10% water, mixed with 2-3% of its weight of calcium carbid entered into reaction at once; a strong condensation took place at once, and after a short time, a thick fluid product of condensation was formed from the acetaldehyde.

Example 1. 100 parts of pure acetaldehyde are gradually mixed and stirred at about 20° C. with 3-5 parts strontium oxid. After some time there takes place, with a great generation of heat, a violent reaction which continues until the condensation of the whole aldehyde is completed. After the completion of the reaction which preferably is carried out with strong cooling, the excess of the catalyzer is neutralized, for instance by diluted hydrochloric acid, and the thick fluid and colorless product obtained is at once submitted to vacuum distillation, a single product being obtained. If, on the contrary, the product of condensation is left to stand for a long time before distillation, or if larger quantities of the catalyzer are used, the condensation will continue, and the product obtained will not be a single one.

Example 2. 100 parts of acetaldehyde containing 5-10 parts of water, are mixed and stirred with 1-4 parts of calcium oxid. The course of the reaction is the same as in the Example 1.

If the acetaldehyde is mixed with more water, for instance 20 parts, the reaction will be still more energetic.

Example 3. 100 parts of acetaldehyde are mixed with about 8 parts of water, whereupon about 2-4 parts of calcium carbid, preferably in the form of powder are stirred in. The reaction which begins after a short time, is preferably carried out slowly, with strong cooling to avoid a high temperature. After the completion of the reaction, the thick fluid product obtained is at once distilled in a vacuum. In this case, aldol is obtained in good quantities. The residue is very small.

If, on the contrary, the reaction is carried out at a high temperature, products of condensation of a higher boiling point will be obtained partly in place of the aldol.

The process can be advantageously carried out also by starting the reaction with only part of the acetaldehyde, the rest being gradually introduced as the reaction proceeds. In this way the reaction can be better regulated.

I claim:

1. A process of making condensation products from acetaldehyde which comprises mixing an alkaline earth metal-containing substance capable of reacting with water to form a hydroxid, with a mixture composed of pure acetaldehyde and a small per cent. of water.

2. A process of making condensation products from acetaldehyde which comprises mixing oxids of the alkaline earths with acetaldehyde.

3. A process of making condensation products from acetaldehyde which comprises mixing oxid of strontium with acetaldehyde.

4. A process of making condensation products from acetaldehyde which comprises gradually mixing under strong cooling conditions, an alkaline earth metal-containing substance capable of reacting with water to form a hydroxid, with a mixture composed of pure acetaldehyde and a small per cent. of water.

5. A process of making condensation products from acetaldehyde which comprises gradually mixing, under strong cooling conditions, an alkaline earth, metal-containing substance capable of reacting with water to form a hydroxid, with a mixture composed of pure acetaldehyde and a small per cent of water.

6. A process of making condensation products from acetaldehyde which comprises mixing an alkaline earth metal-containing substance capable of reacting with water to form a hydroxid, with a mixture composed of pure acetaldehyde and a small per cent. of water, a portion of the acetaldehyde being added during the course of the reaction.

7. A process of making aldol which comprises mixing and treating an alkaline earth metal-containing substance capable of reacting with water to form a hydroxid, with a mixture composed of pure acetaldehyde and a small per cent. of water, subsequently neutralizing the reaction mixture with acid, and distilling the resulting product in a vacuum.

In testimony whereof I have signed my name to this specification in the presence of two subscribing witnesses.

NATHAN GRÜNSTEIN.

Witnesses:
JEAN GRUND,
HARRY E. CARLSON.